United States Patent
Bolden et al.

(10) Patent No.: US 9,153,808 B2
(45) Date of Patent: Oct. 6, 2015

(54) BATTERY HOLD DOWN DEVICE USING CLAMP ESCALATOR

(71) Applicants: Darnell M. Bolden, Hughesville, MD (US); Richard C. Lee, Upper Marlboro, MD (US)

(72) Inventors: Darnell M. Bolden, Hughesville, MD (US); Richard C. Lee, Upper Marlboro, MD (US)

( * ) Notice: Subject to any disclaimer, the term of this patent is extended or adjusted under 35 U.S.C. 154(b) by 335 days.

(21) Appl. No.: 13/842,363

(22) Filed: Mar. 15, 2013

(65) Prior Publication Data

US 2014/0272511 A1     Sep. 18, 2014

Related U.S. Application Data

(60) Provisional application No. 61/613,982, filed on Mar. 22, 2012.

(51) Int. Cl.
| | |
|---|---|
| *H01M 2/10* | (2006.01) |
| *B60R 16/04* | (2006.01) |
| *B60L 11/18* | (2006.01) |
| *B60K 1/04* | (2006.01) |
| *H01M 10/04* | (2006.01) |

(52) U.S. Cl.
CPC ............ *H01M 2/1083* (2013.01); *B60R 16/04* (2013.01); *B60K 1/04* (2013.01); *B60L 11/1877* (2013.01); *H01M 2/1072* (2013.01); *H01M 10/0481* (2013.01); *Y10T 29/49948* (2015.01)

(58) Field of Classification Search
CPC ............ H01M 2/1072; H01M 2/1083; H01M 10/0481; B60R 16/04; Y10T 29/49948; B60K 1/04; B60L 11/1877
USPC .......................................................... 429/100
See application file for complete search history.

(56) References Cited

U.S. PATENT DOCUMENTS

| | | | | |
|---|---|---|---|---|
| 1,636,562 | A * | 7/1927 | Hick | 180/68.5 |
| 6,230,834 | B1 * | 5/2001 | Van Hout et al. | 180/68.5 |

* cited by examiner

*Primary Examiner* — Jonathan Jelsma
*Assistant Examiner* — Omar Kekia (57) ABSTRACT

The present invention provides a device and a method for securely clamping and unclamping a battery in a battery receiving tray, the device comprising an escalatable hold down clamp for clamping the battery, an escalator means for lifting or lowering the clamp in screwed engagement with the escalatable hold down clamp, a hold down rod for fixedly engaging the hold down device onto the battery tray.

14 Claims, 9 Drawing Sheets

BATTERY HOLD DOWN DEVICE USING CLAMP ESCALATOR

This invention claims priority to U.S. Provisional 61/613,982 filed Mar. 22, 2012, the disclosure of which is incorporated herein by reference.

FIELD OF THE INVENTION

The present invention relates generally to devices and methods for securely restraining and unrestraining batteries, particularly batteries used for operations in internal combustion engines whether mounted on the engine compartment or elsewhere on the vehicle or machine.

BACKGROUND OF THE INVENTION

Every machine using an internal combustion engine requires a battery primarily to provide direct current for the starter mechanism, usually a starter motor geared to the cranking mechanism. For hybrid vehicles, the batteries are a more integral part of the vehicle's functionality. Batteries also store current for the operation of the machine's other electrical and electronic devices.

Whether placed in the engine compartment of the machine or elsewhere, batteries must be securely held down during operations of the internal combustion engine in order to prevent contacts with the battery posts' terminals.

All machines, including automobiles, typically have a battery hold down mechanism for securing their batteries. The standard battery hold down mechanism uses nuts or locknuts to secure the battery with hold down rods and clamps. Battery replacement tends to require tools; such as ratchets, extensions and sockets, and sometimes the dexterity to reach hard to find crevices in the engine compartment. Furthermore, weather-beaten hold downs are subject to rust and corrosion, making it very difficult for the average consumer to disengage the battery from the hold down rods and hold down clamps. For technicians, replacing batteries, particularly ones with rusted nuts and bolts, can be time consuming. In any case, ratcheting hold down rods and hold down clamps is hazardous as improperly placed tools can bridge the battery posts leading to explosion or electrocution.

In automobile engines, a battery hold down system would typically comprise a cradling or receiving tray for cradling the battery in a battery compartment, openings on the battery compartment or receiving tray for pivotally engaging screw-tipped hold down rods, and horizontally disposed hold down clamps for securely clamping the battery inside the cradling tray and engaging the hold down rods, and washers and nuts for engaging the hold down rods to the clamps.

Henehan (U.S. Pat. No. 2,833,363) uses diagonally disposed j-rods extending from slots on the sidewalls of the battery tray through a clamp designed as a battery retaining loop member and connected thereto by wing nuts.

Hall (U.S. Pat. No. 2,994,395) uses a Z-clamp having a vertically extending member and multiple holes on the horizontal extending member of the clamp for slottable engagement of j-rods between slots on the sidewall of the battery tray and any one of the holes on the horizontal member wherein the rod is fastened to the clamp.

Raney and Zednik, Jr. (U.S. Pat. No. 3,105,566) uses a bottom-mounted system wherein one side of the hold down clamp engages the tray underneath and the opposite side pushes into the side flange near the bottom of the battery. A bolt then secures the hold down clamp to the tray.

Other battery clamping mechanisms are taught in Paller (U.S. Pat. No. 3,125,177), Schlapman (U.S. Pat. No. 3,333,810). Bowers and Breidegam (U.S. Pat. No. 3,834,479, and U.S. Pat. No. 3,866,704). DiFazio (U.S. Pat. No. 4,520,887) relied on a stud from an adjacent mounting structure to secure the hold down, which consisted of a somewhat complicated mix of two angled members interconnected by a cross-bar member, the one end having an eyelet and the opposite end an upstanding tab which connects to the mounting structure. An L bracket was employed on the opposite end. Valdez (U.S. Pat. No. 4,565,256) produced elastomeric hold downs for attenuating shock and allegedly conforming to varying battery venting arrangements.

As used herein, the terms top-mounted and bottom-mounted relate to the position of the hold down clamp with respect to the battery in securing it to the battery receiving tray. If the hold down clamp is across the top of the battery or along its upper rim, the hold down is considered top-mounted. If the hold down clamp is around the lower rim or the bottom flange of the battery the hold down is considered bottom-mounted. The automobile industry generally employs either the bottom or top-mounted methods of securing the battery against the receiving tray.

Heretofore, whenever a battery had to be removed within a shop environment, tools of different shapes and sizes are needed depending on the make and model of the machine. Other challenges include being careful not to lose nuts and other parts of the hold down mechanism as well as being extremely careful not to bridge the posts of the battery with tools in fishing for tools and exerting the torque needed for removal and reinstallation. Often this is done at great expenditure of time and expense to consumers.

SUMMARY OF THE INVENTION

These and other problems are obviated by the present invention which provides a battery hold down device for securely clamping and unclamping a battery in a battery receiving tray, the device comprising an escalatable hold down clamp for clamping the battery, an escalator means for lifting or lowering the clamp in screwed engagement with the escalatable hold down clamp, a hold down rod for fixedly engaging the hold down device unto the battery tray.

In a preferred embodiment, the escalatable hold down clamp is top-mounted.

In a most preferred embodiment the escalatable hold down clamp is bottom-mounted.

In another embodiment, the esclatable hold down clamp is sized and configured to engage a battery having a bottom flange.

In another most preferred embodiment, the escalator comprises a hollow shaft that is screwedly connected to the escalatable hold down clamp.

In another preferred embodiment, the hold down rod is a pass through bolt received in the hollow shaft of the escalator.

In a preferred embodiment, the escalator further comprises a grippable handle.

In a most preferred embodiment, the grippable handle is integrally molded with the escalator shaft.

The present invention also provides a method for securely clamping and unclamping a battery in a battery receiving tray using a hold down device comprising one escalatable hold down clamp for clamping the battery, an escalator means for lifting or lowering the clamp in screwed engagement with the escalatable hold down clamp, a hold down rod for fixedly engaging the hold down device unto the battery tray and wherein the battery is clamped and unclamped by manipulating the escalator means.

In a preferred method, the escalatable clamp is top-mounted.

In a most preferred method, the escalatable clamp is bottom-mounted.

In yet another preferred method, the esclatable hold down clamp is sized and configured to engage a battery having a bottom flange.

In another embodiment, the method uses an escalator comprising a hollow shaft that is screwedly connected to the escalatable hold down clamp.

In a most preferred method, the hold down rod is a pass through bolt received in the hollow shaft of the escalator.

In yet another method, the escalator further comprises a grippable handle.

In another method, two or more hold down devices may be used at opposite ends of the battery.

DETAILED DESCRIPTION OF THE INVENTION

Figure 1:
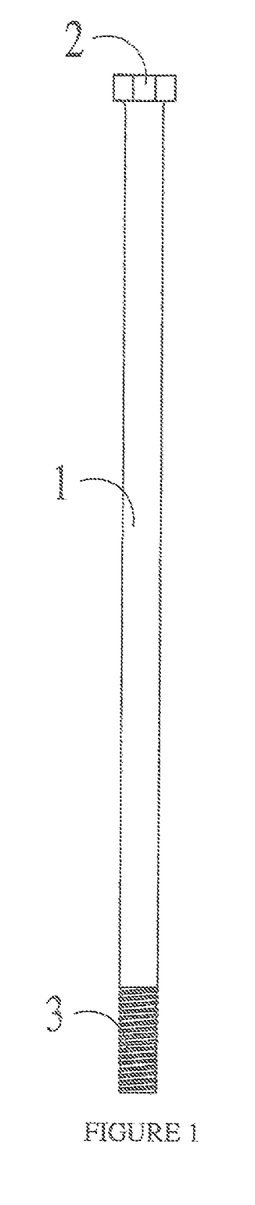
FIG. 1 is a hold down rod in accordance with one embodiment of the invention.

In the drawings, not drawn to scale, in which like numerals represent like elements. FIG. 1 illustrates a hold down rod 1,2,3 in accordance with one embodiment of the invention comprising a bolt head 2, connected to a solid midsection 1 and ending with a threaded end 3.

Figure 2:
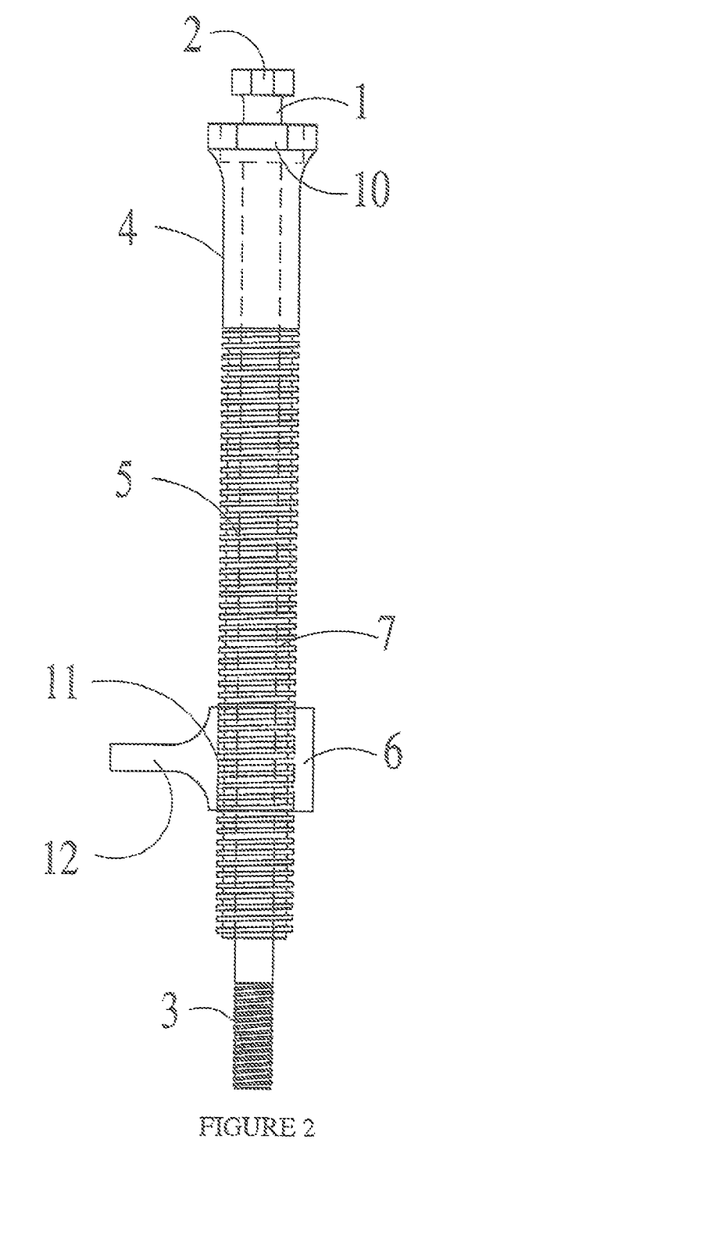
FIG. 2 is an assembled view of a device in accordance with the invention comprising a hold down rod, an escalator and a clamp.

FIG. 2 is an assembled view of a device in accordance with the invention comprising a hold down rod 1,2,3, an escalator 4 with grippable handle 10, and a hold down clamp 6. The hold down rod 1,2,3 passes through the hollow shaft 7 of the escalator 4 with the bolt head 2 being recessed in the top of the escalator 4, the solid midsection 1 running though the inner length of the escalator 4, and the threading region 3 extending out through the opposing end of the escalator 4 opposite the bolt head 2; the outer threaded region 5 of escalator 4 being threaddedly connected to the inner threads 11 of the clamp 6, having a clamping member 12.

Figure 3:
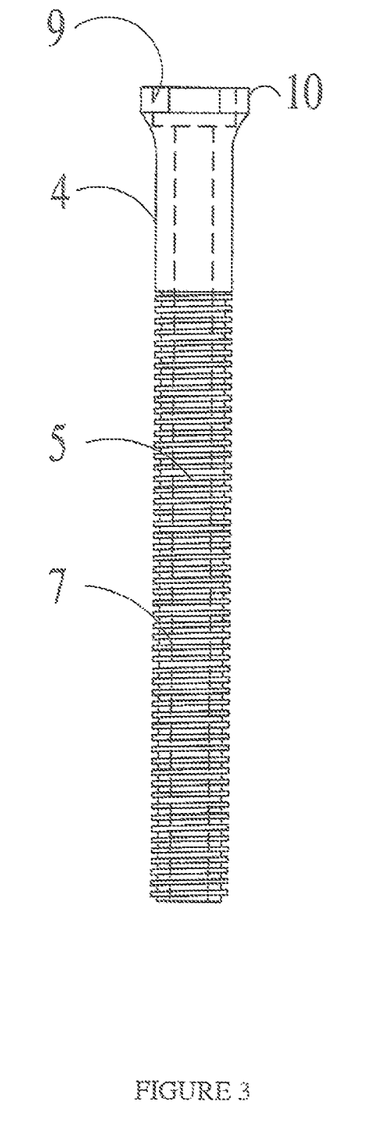
FIG. 3 is the side view of an escalator means in accordance with one embodiment of the invention.

FIG. 3 is the side view of an escalator 4 in accordance with one embodiment of the invention. The escalator 4 comprises a grippable handle 10, a hollow shaft 7, running from the top to the bottom of the escalator 4, an outer threaded region 5 for escalatable engagement with the inner threaded region 11 of the hold down clamp 6 (clamp 6 and its threaded region 11 not shown in FIG. 3).

Figure 4:
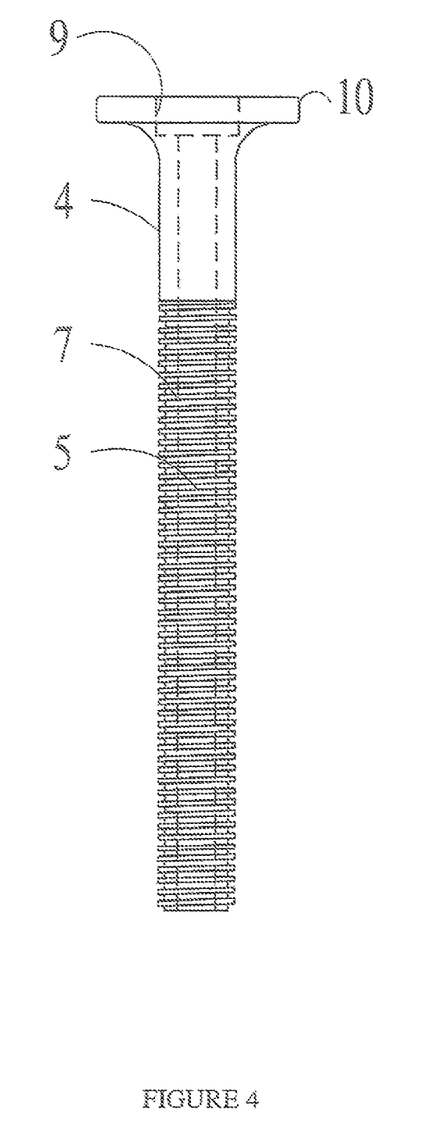
FIG. 4 is a front view of an escalator means in accordance with one embodiment of the invention.

In FIG. 4, showing the front view of the escalator means in accordance with one embodiment of the invention, the hollow shaft 7, extends through the entire length of the escalator 4 which may optionally comprise a solid region adjacent the threaded region 5.

Figure 5:
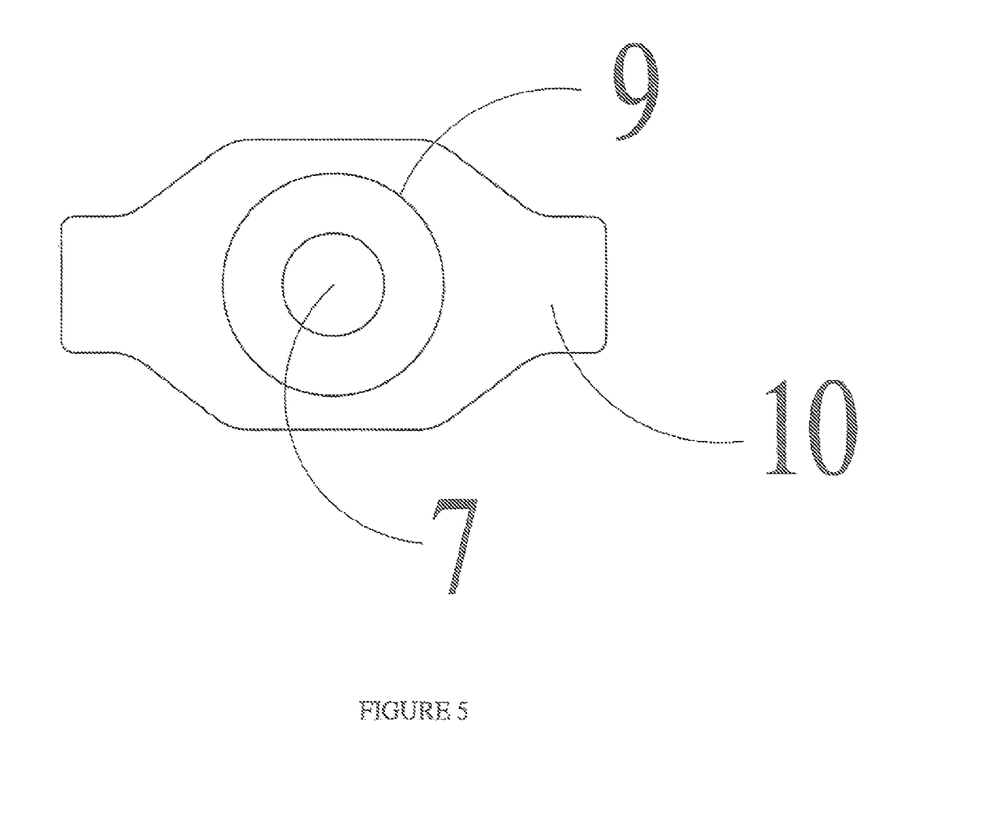
FIG. 5 is a top view of an escalator in accordance with one embodiment of the invention.

FIG. 5 is a top view of an escalator in accordance with one embodiment of the invention. FIG. 5 illustrates the top end of the escalator 4, the grippable handle 10, the shaft 7 for receiving the bolt 1,2,3 there through and a landing area 9 for receiving the bolt head 2 of the bolt 1,2,3. In a preferred arrangement, the top of the bolt head 2 is flush with or slightly recessed from the top of the escalator 4, and separated therefrom by sufficient space to allow use of a socket wrench to screw down the threaded end 3 of the hold down bolt 1,2,3 unto the battery receiving tray 14 or battery compartment. This invention is not limited in anyway by the design of the grippable handle.

Figure 6:
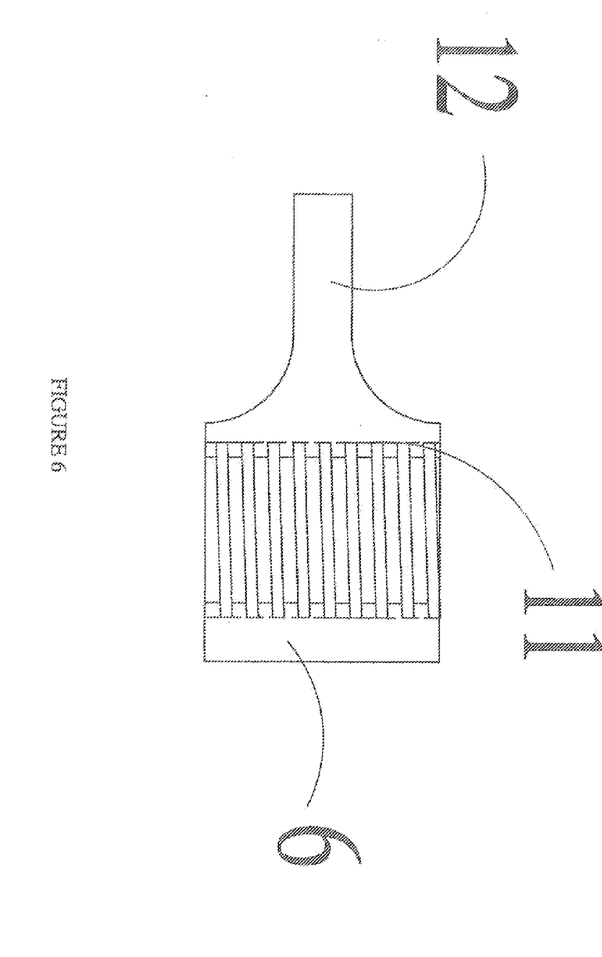
FIG. 6 is a side view of an escalatable hold down clamp comprising inner threads in accordance with one embodiment of the invention.
Figure 7:
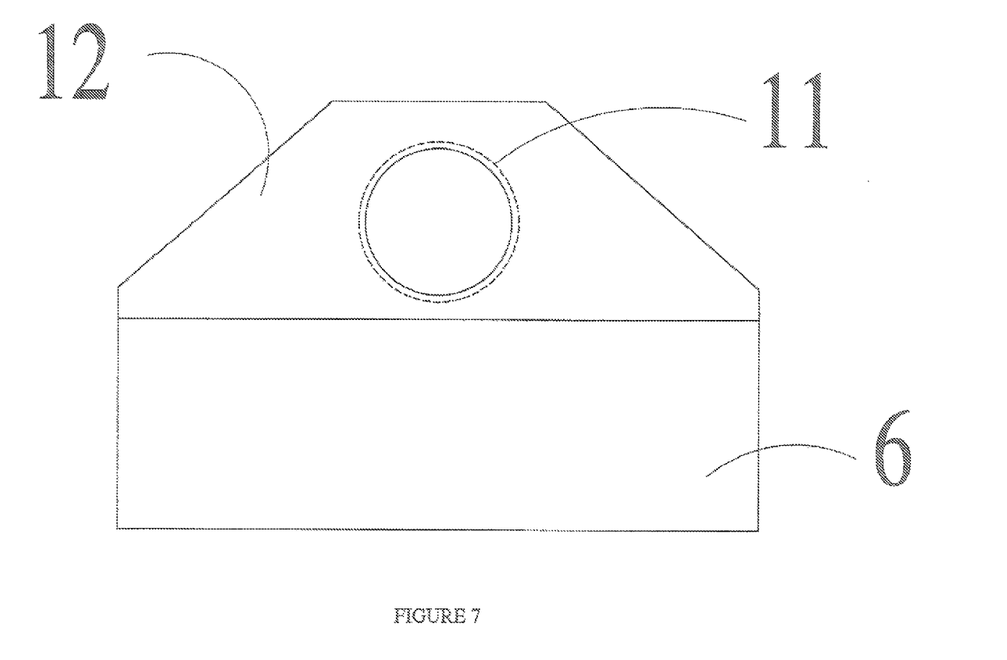
FIG. 7 is a top view of an escalatable hold down clamp comprising inner threads in accordance with one embodiment of the invention.
Figure 8:
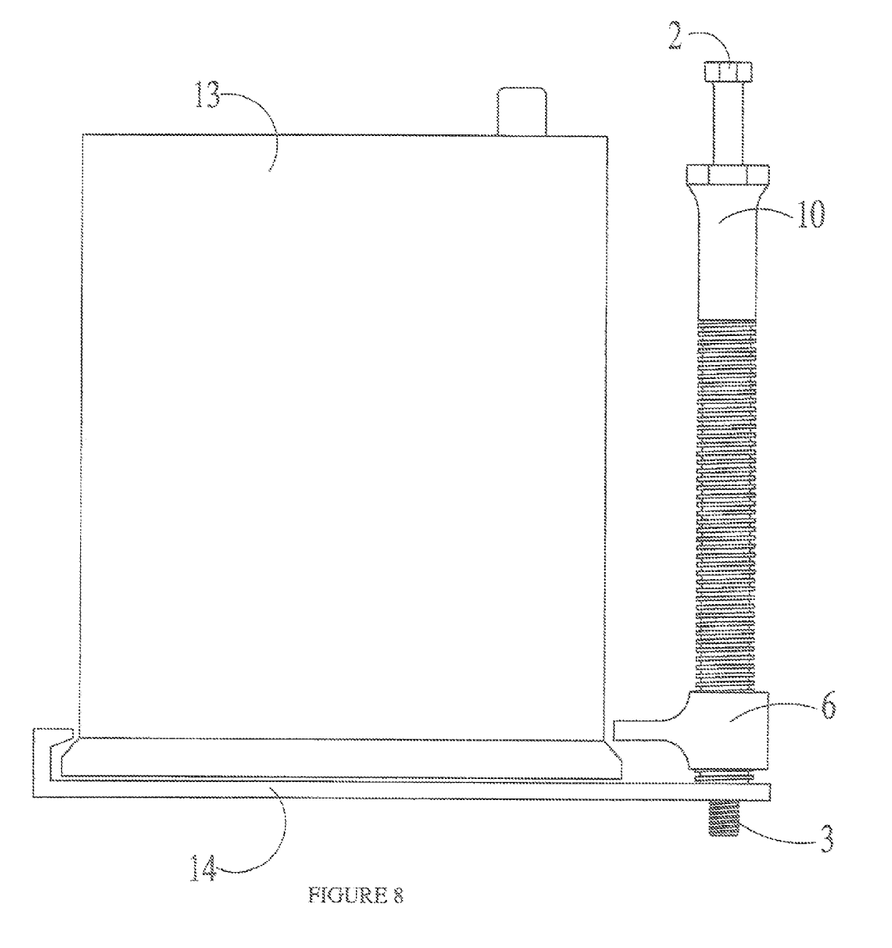
FIG. 8 is an illustration of a completely assembled hold down device in a bottom-mounted arrangement.
Figure 9:
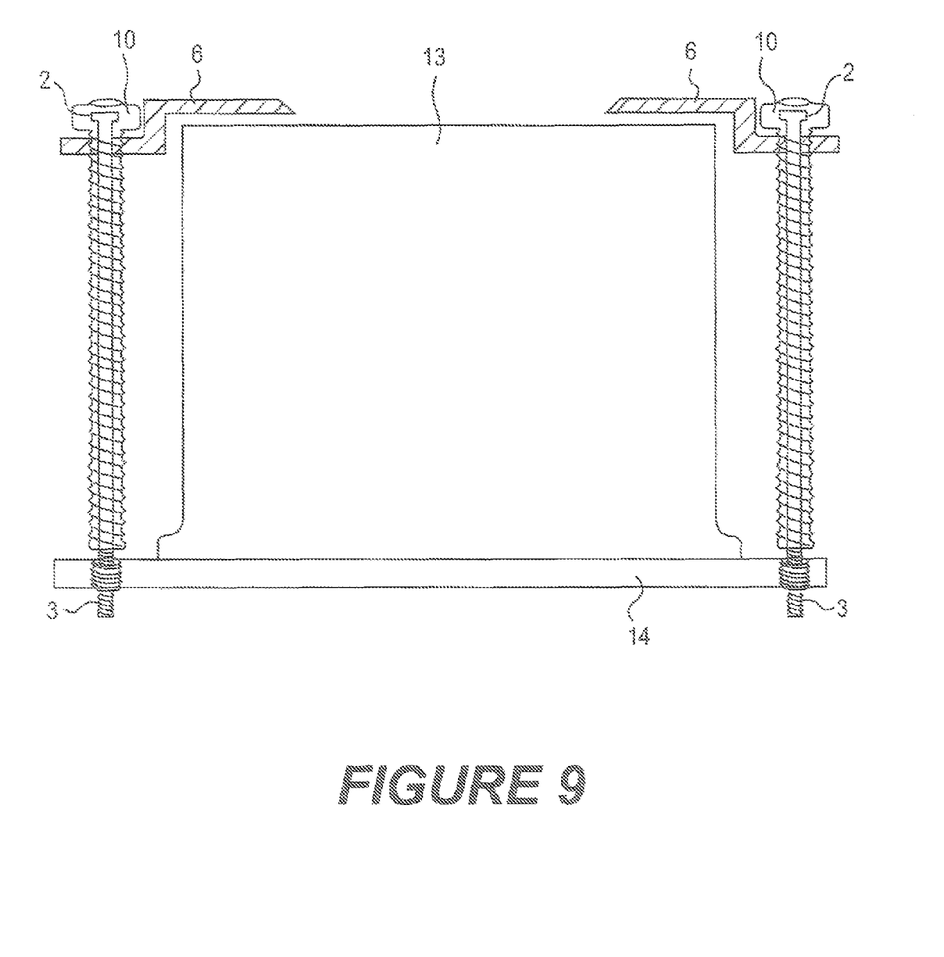
FIG. 9 is an illustration of a completely assembled hold down device in a top-mounted arrangement.

FIG. 6 is a side view of an escalatable hold down clamp 6 comprising inner threads 11 in accordance with one embodiment of the invention. The size and configuration of the clamp is such that it is capable of gripping the battery 13 and clamping it down securely. Any number of ways can be used to achieve sufficient clamping including the configuration of such a clamp 6 with an extended lip region 12 for engaging the top of the battery 13 or the flange on the bottom of the battery 13. See FIGS. 6 through 9. When used in a top mounted arrangement, the lip region 12 may be further extended along the top of the battery to provide more clamping force in a two hold down arrangement on opposite sides of the battery as illustrated in FIG. 9.

Rather than using a tool such as a ratchet, wrench, pliers, etc. during the initial installation of the hold down clamp and each time thereafter, the present invention utilizes the escalation as a means for tightening and loosening the hold down clamp 6 onto and away from the battery 13. A tool may be needed to tighten the device to the battery tray 14 during initial installation. To assemble the device a user threads the escalator 4 into the hold down clamp 6, then passes the hold down rod 1,2,3 through the shaft 7 and thread the threaded region 3 into a receiving threaded hole in the battery receiving tray 14 or compartment. Thereafter, whenever a battery change is necessary no tools are required. Rather the grippable handle 10 of the escalator 4 is turned by hand—either clockwise or counter-clockwise (depending on whether the threads of the escalator are left- or right-hand threads). Besides the preferred embodiment, requiring simple hand-cranking, future embodiments may achieve escalation of hold down clamp 6 on the escalator 4 by means of pneumatics, hydraulics, pneudraulics, electronics, stepper motor drive circuits, or by some other means. This escalation method allows the entire hold down assembly to stay-in-place permanently after the initial installation.

It is understood that the escalator 4, the hold down clamp 6 and the hold down rod 1,2,3 of the present invention can be made of any suitable material known in the art including but not limited to galvanized steel, stainless steel, or any untreated metal or metal treated with any paint, enamel, powder coating, or polyplastic covering that protects it from rust or corrosion; or made of acetal or acetal resin, PVC or PVC resin, Polyethylene, Polypropylene, polyvinylidene fluoride, Ethylene-chloride trifluoroethylene copolymer, or any other polyplastic or comparable material with a rigid structure sufficient to secure the battery 13 to the tray 14. It is not intended that this invention be limited in anyway by the nature of the materials used in constructing the various embodiments.

As used herein, the battery receiving tray 14 includes any flat surface designed to receive a battery 13, whether in the engine compartment or elsewhere on the machine or vehicle. It is understood that the receiving tray 14 can comprise a vibration damper.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents. Accordingly, the invention is not limited by the embodiments described above which are presented as examples only but can be modified in various ways within the scope of protection defined by the appended patent claims.

What is claimed is:

1. A battery hold down assembly for securely clamping and unclamping a battery in or to a battery receiving tray or compartment, the hold down assembly comprising:
    an escalatable hold down clamp having inner threads running from the top to the bottom of said clamp and configured to clamp the battery;
    an escalator comprising a hollow shaft running from the top to the bottom of the escalator and an outer threaded region, wherein the outer threaded region is mated with the inner thread of the escalatable hold down clamp;
    a hold down rod which passes through the hollow shaft of the escalator and is fixedly engaged to the battery receiving tray or compartment allowing the escalator to turn or spin unopposed by the hold down rod;
    wherein the escalator is configured to raise and lower the clamp while the battery hold down assembly remains stationary or permanently fixed to the battery receiving tray or compartment; and
    wherein the turning of the escalator is configured to be achieved by simple hand-cranking, electronics, stepper motor drive circuits, pneumatics, hydraulics, pneudraulics, or a combination thereof.

2. The battery hold down assembly of claim 1, wherein the escalatable hold down clamp is top-mounted.

3. The battery hold down assembly of claim 1, wherein the escalatable hold down clamp is bottom-mounted.

4. The battery hold down assembly of claim 1 wherein the escalatable hold down clamp is sized and configured to engage a battery having a bottom flange.

5. The battery hold down assembly of claim 1, wherein the hold down rod which passes through the hollow shaft of the escalator is a pass through bolt.

6. The battery hold down assembly of claim 5, wherein the escalator further comprises a grippable handle.

7. The battery hold down assembly of claim 6, wherein the grippable handle is integrally molded with the escalator shaft.

8. A method for securely clamping and unclamping a battery in a battery receiving tray or compartment using a hold down assembly comprising:
    one escalatable hold down clamp having inner threads running from the top to the bottom of said clamp and configured to clamp the battery;
    an escalator comprising a hollow shaft running from the top to the bottom of the escalator and an outer threaded region, wherein the outer threaded region is mated with the inner thread of the escalatable hold down clamp;
    a hold down rod which passes through the hollow shaft of the escalator and is fixedly engaged to the battery receiving tray or compartment allowing the escalator to turn or spin unopposed by the hold down rod;
    wherein the escalator is configured to raise and lower the clamp while the battery hold down assembly remains stationary or permanently fixed to the battery receiving tray or compartment; and
    wherein the turning of the escalator is configured to be achieved by simple hand-cranking, electronics, stepper motor drive circuits, pneumatics, hydraulics, pneudraulics, or a combination thereof.

9. The method of claim 8, wherein the escalatable clamp is top-mounted.

10. The method of claim 8, wherein the escalatable clamp is bottom-mounted.

11. The method of claim 8, wherein the escalatable hold down clamp is sized and configured to engage a battery having a bottom flange.

12. The method of claim 8, wherein the hold down rod which passes through the hollow shaft of the escalator is a pass through bolt.

13. The method of claim 12, wherein the escalator further comprises a grippable handle.

14. The method of claim 8, further comprising the use of at least two hold down assemblies.

* * * * *